United States Patent
Imai

(10) Patent No.: US 6,217,080 B1
(45) Date of Patent: Apr. 17, 2001

(54) COUPLING ASSEMBLY FOR FLUID TRANSFER USE

(75) Inventor: Hiroshi Imai, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 0 days.

(21) Appl. No.: 09/207,147

(22) Filed: Dec. 8, 1998

(30) Foreign Application Priority Data

Jun. 25, 1998 (JP) .................................. 10-194979

(51) Int. Cl.[7] ........................... F16K 31/122; F16L 37/28
(52) U.S. Cl. ......................... 285/13; 285/920; 285/315; 137/614.06
(58) Field of Search ............................. 285/315, 920, 285/13, 316; 137/614.06

(56) References Cited

U.S. PATENT DOCUMENTS

| | | | |
|---|---|---|---|
| 2,887,124 | * 5/1959 | Mehl | 137/614.04 |
| 4,495,967 | * 1/1985 | Needham | 285/315 |
| 4,496,172 | * 1/1985 | Walker | 285/315 |
| 4,516,795 | * 5/1985 | Baugh | 285/315 |
| 4,632,432 | * 12/1986 | Reneau | 285/315 |
| 4,671,539 | * 6/1987 | Reneau | 285/920 |
| 4,805,417 | * 2/1989 | Weaver | 137/614.04 |
| 4,902,044 | * 2/1990 | Williams | 285/920 |
| 5,251,668 | * 10/1993 | Walther | 285/920 |
| 5,441,310 | * 8/1995 | Barrett | 285/920 |

FOREIGN PATENT DOCUMENTS

| | | | |
|---|---|---|---|
| 461741 | * 12/1991 | (EP) | 285/920 |

* cited by examiner

Primary Examiner—Eric K. Nicholson
(74) Attorney, Agent, or Firm—Browdy and Neimark

(57) ABSTRACT

In the coupling assembly, after a plug member 42 is slightly inserted into a socket member 15 with a slight push of the plug member 42 relative to the socket member 15, air pressure enables the plug member 42 to reach its innermost position inside the socket member 15 so that the plug member 42 is connected with the socket member 15. The coupling assembly comprises: the socket member 15 for receiving therein a valve 16 which is opened when pushed; and, a cylindrical slider 25 for slidably receiving therein the socket member 15. The slider 25 is provided with a piston 28 and an engaging means 34 in its rear and its forward end portion, respectively. Through the engaging means 34, a plug member 42 is connected with the forward end portion of the slider 25. The slider 25 is capable of moving relative to the socket member 15 when air is forced in one side of the piston 28 while discharged out of the other side of the piston 28, so that the plug member 42 is permitted to reach its innermost position inside the socket member 15 when the slider 25 is moved.

4 Claims, 5 Drawing Sheets

COUPLING ASSEMBLY FOR FLUID TRANSFER USE

BACKGROUND OF THE INVENTION

1. Field of the Invention

The present invention relates to a coupling assembly used, for example, in transferring fluid (i.e., gases and/or liquids such as high purity chemicals like an etching liquid used in production of semiconductors) from a storage tank of its production plant to a tank lorry.

2. Description of the Related Art

In general, a conventional coupling assembly used in the above mentioned field comprises a stationary female or socket member and a movable male or plug member which is axially aligned with the socket member in coupling operation thereof. In this coupling operation, the male or plug member is inserted into the female or socket member so that these members are connected with each other in a fluid-tight or liquid-tight manner, as is disclosed, for example, in Japanese Utility Model Publication No. 1-10557.

In the conventional coupling assembly described above, the female and the male member of the assembly are connected with each other exclusively through a user's manual operation. In case that the coupling assembly is of a small-diameter type, it is possible for the user to manually perform its coupling operation easily. However, in the case where the coupling assembly is of a large-diameter type, it is very difficult for the user to manually perform its coupling operation, since a considerably large effort is required of the user to complete the coupling operation of such large-diameter coupling assembly.

SUMMARY OF THE INVENTION

Consequently, it is an object of the present invention to provide a coupling assembly for fluid transfer use, wherein: a male member, i.e., plug member temporarily inserted into a female member, i.e., socket member with a slight push of the plug member relative to the socket member caused by the hand of a user; and, thereafter, air pressure is applied to the coupling assembly to cause the plug member to reach its innermost position inside the socket member so that the plug member is completely connected with the socket member.

According to a first aspect of the present invention, the above object of the present invention is accomplished by providing:

A coupling assembly for fluid transfer use, comprising:
  a socket member for receiving therein a valve which is opened when pushed;
  a cylindrical slider for slidably receiving therein the socket member;
  the cylindrical slider being provided with a piston and an engaging means in its rear and its forward end portion, respectively, through which engaging means a plug member is connected with the forward end portion, the cylindrical slider being capable of moving when air is forced in one side of the piston while discharged out of the other side of the piston;
  whereby the plug member is permitted to further enter the socket member and reach its innermost position when the cylindrical slider is moved.

According to a second aspect of the present invention, the above object of the present invention is accomplished by providing:

The coupling assembly for fluid transfer use, as set forth in the first aspect of the present invention, wherein the engaging means comprises:
  a ball disposed in the cylindrical slider; and
  a concave portion formed in the plug member.

According to a third aspect of the present invention, the above object of the present invention is accomplished by providing:

The coupling assembly for fluid transfer use, as set forth in the first or the second aspect of the present invention, wherein:
  the socket member is provided with a drain which permits the fluid remaining in the socket member to drain off.

DESCRIPTION OF THE PREFERRED EMBODIMENT

Hereinbelow, the present invention will be described in detail with reference to the accompanying drawings.

Figure 1:
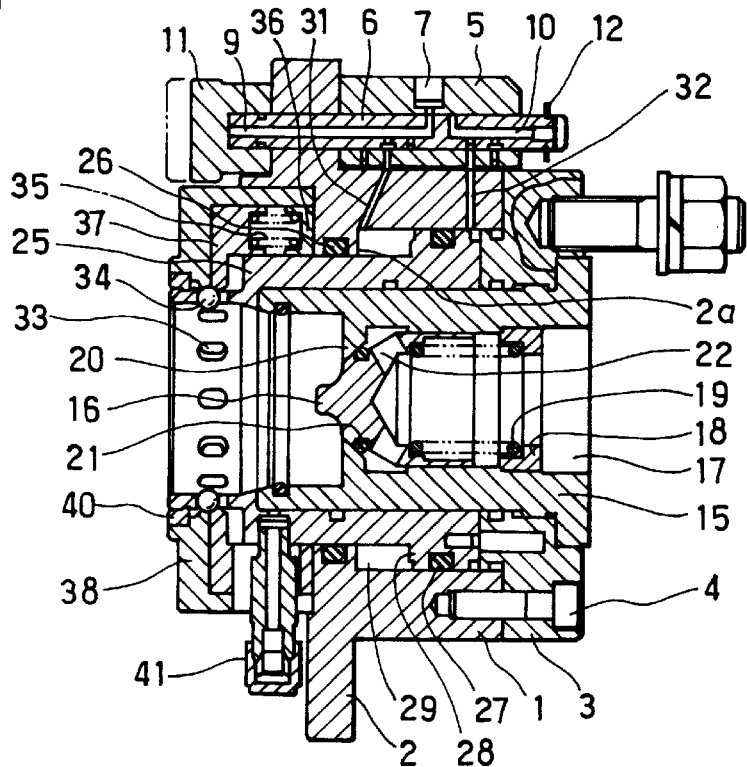
FIG. 1 is a longitudinal sectional view of an embodiment the coupling assembly of the present invention.
Figure 2:
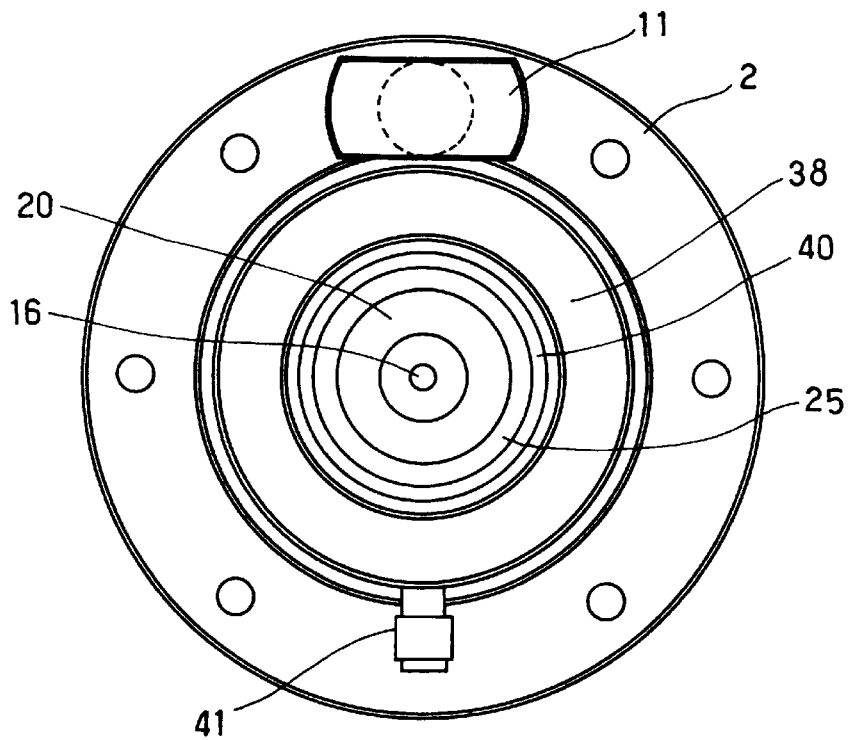
FIG. 2 is a left side view of the embodiment shown in FIG. 1.

In FIG. 1, the reference numeral 1 denotes a housing provided with a flange portion 2. An annular base member 3 is oppositely disposed from the flange portion 2 of the housing 1, and fixedly mounted on the housing 1 by means of a plurality of bolts 4. A shaft housing 5 is fixedly mounted on an upper surface of the housing 1 and brought into close contact with the flange portion 2. On the other hand, a shaft 6 is slidably mounted in the shaft housing 5 to pass through the flange portion 2 and with the shaft housing 5.

Figure 3:
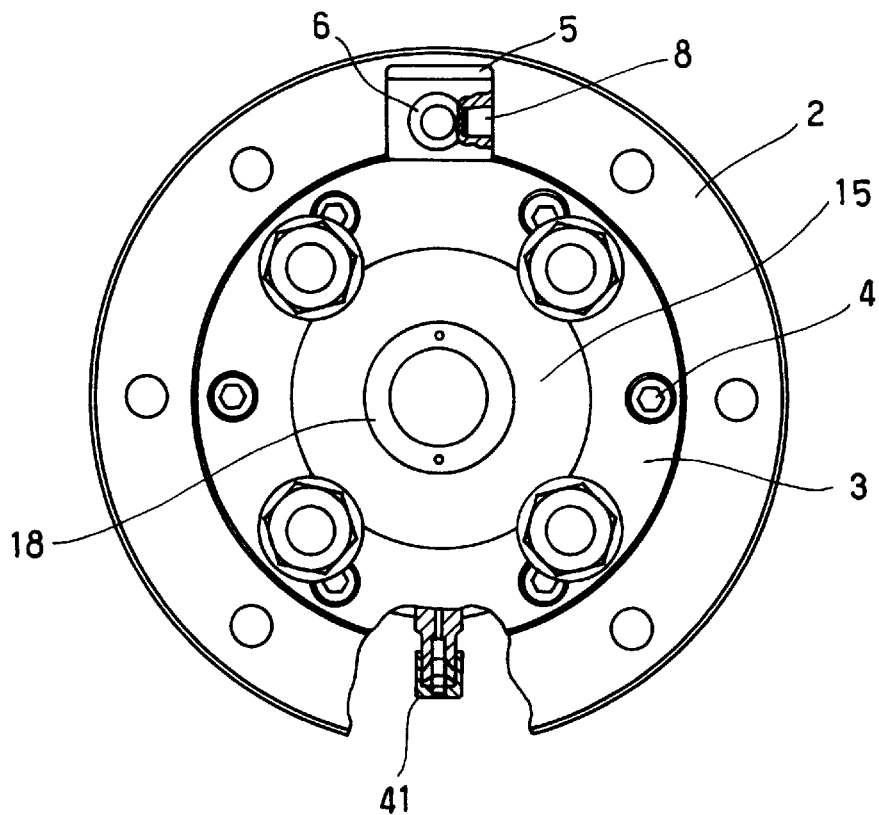
FIG. 3 is a right side view of the embodiment shown in FIG. 1.

The shaft 6 is provided with a pair of axial air passages 9, 10, which selectively communicate with an air supply port 7 or an air discharge port 8 (shown in FIG. 3), both of which ports 7, 8 are formed in the shaft housing 5. In FIG. 1, the reference numeral 11 denotes a knob, which is fixedly mounted on a forward end portion of the shaft 6. A user who wants to move the shaft 6 grips the knob 11 and axially and slidably moves the shaft 6. A stopper 12 is mounted on the other, i.e., rear end portion of the shaft 6, which end portion projects rearward from a rear surface of the shaft housing 5, as shown in FIG. 1. In pull operation of the shaft 6 relative to the shaft housing 5, the stopper 12 butts at the rear surface of the shaft housing 5 to define a pull stroke of the shaft 6.

In FIG. 1, the reference numeral 15 denotes a socket member in which a valve 16 is incorporated. The socket member 15 is inserted into the housing 1 from the side of the annular base member 3. On the other hand, the valve 16 is constantly urged forward by a spring 19. This spring 19 is supported by a stopper 18, which is fitted in an opening portion 17 of the socket member 15. The valve 16 thus urged butts against an annular valve seat 20 through an O-ring 21. This valve seat 20 is formed in an inner wall of the socket member 15. Due to the above construction of the valve 16, a forward portion (i.e., left-hand side) of the valve seat 20 is isolated from a rearward portion (i.e., right-hand side) of the same 20 in a watertight (i.e., fluid-tight) manner, as shown in FIG. 1. A plurality of fluid communication passages 22 are formed in the valve 16, through which passages 22 the liquid of the left-hand side of the valve seat 20 is permitted to communicate with the liquid of the right-hand side of the valve seat 20 when the valve 16 is pushed and opened against a resilient force exerted by the spring 19 thereon, as will be hereinafter more fully described.

In FIG. 1, the reference numeral 25 denotes a cylindrical slider which is slidably mounted on the socket member 15 and received in the housing 1. The slider 25 has its forward peripheral portion brought into slidable contact with an O-ring 26 fitted in an inner small-diameter portion 2a of the flange portion 2 of the housing 1. Further, the slider 25 has its rear end portion formed into a piston 28 on which an O-ring 27 is mounted. This O-ring 27 is brought into slidable contact with an inner peripheral surface of the housing 1 to define a pair of air pressure chambers 29, one of which is formed in a forward side of the piston 28 and the other in a rear side thereof. Further, formed in the housing 1 are a plurality of fluid communication passages 31, 32 passing through the inner wall of the housing 1. Through these fluid communication passages 31, 32, the air pressure chambers 29 are communicated with the air passages 9, 10 of the shaft 6.

As is clear from FIG. 1, the slider 25 has its forward end portion reduced in diameter to form a small-diameter portion in which a plurality of through-holes serving as ball support holes 33 are formed. Each of these support holes 33 is tapered so as to flare radially outwardly to permit a ball 34 to be supported therein in a condition in which the ball 34 is slightly movable in the hole 33 in an axial direction of the slider 25.

In FIG. 1, the reference numeral 35 denotes a plurality (for example, four) of springs which are disposed on the outer peripheral surface of the slider 25 at equal angular intervals. Each of these springs 35 is sandwiched between: a spring support 36 fixedly mounted on the slider 25; and, a movable inner collar 37. The reference numeral 38 denotes a sleeve member for housing the springs 35, spring support 36 and the inner collar 37 therein. The reference numeral 40 denotes a stopper fitted in a clearance between: an outer peripheral portion of the forward end portion of the slider 25: and, the sleeve member 38. The reference numeral 41 denotes a drain joint for discharging a liquid remaining inside the socket member 15.

This drain joints 41 may be interposed between adjacent ones of the springs 35. On the other hand, a conventional type axial coil spring such as one surrounding the entire outer peripheral portion of the slider 25 (see Japanese Utility Model Publication No. Hei 1-10557) provides no installation space for the drain joint 41, and, therefore is not used in the present invention.

Now, referring to FIGS. 4 to 10, each step of the coupling operation of the socket member 15 and the plug member 42 will be described.

Figure 4:
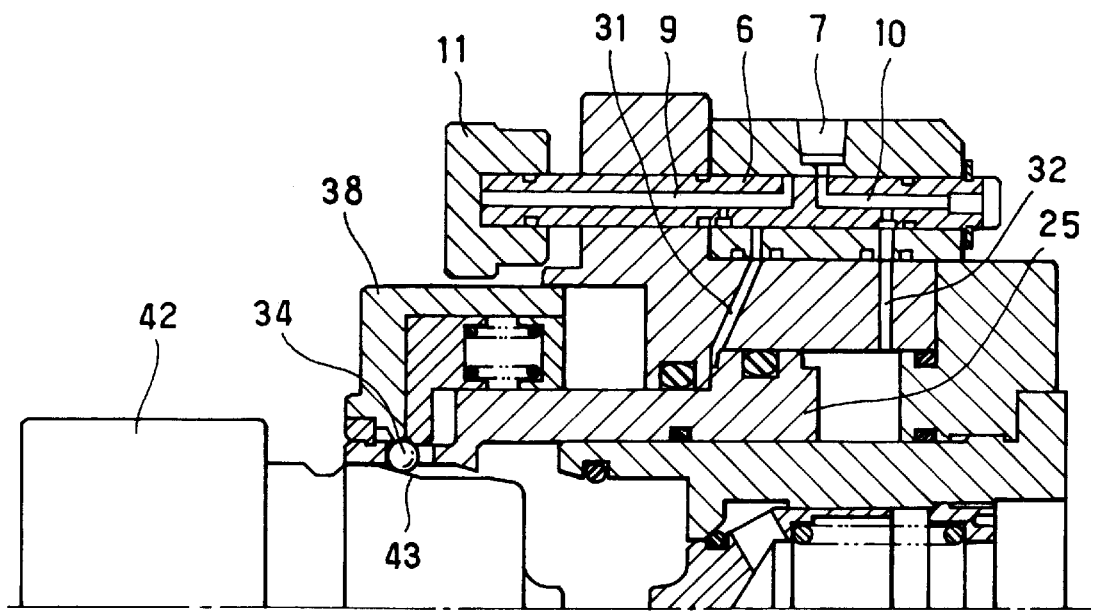
FIGS. 4 to 9 are longitudinal sectional views of the coupling assembly of the present invention, illustrating its coupling operation.

The plug member 42 is held by the hand of the user, and temporarily inserted into the socket member 15, more particularly into the slider 25 of the socket member 15, as shown in FIG. 4. At this time, the shaft 6 is pulled leftward as shown in dotted lines in FIG. 1, so that the air supply port 7 is communicated with both the air passage 10 and the communication passage 32 while the air discharge port 8 is communicated with both the air passage 9 and the communication passage 31. As is clear from FIG. 4, at this time, the slider 25 is in its innermost position.

Figure 5:
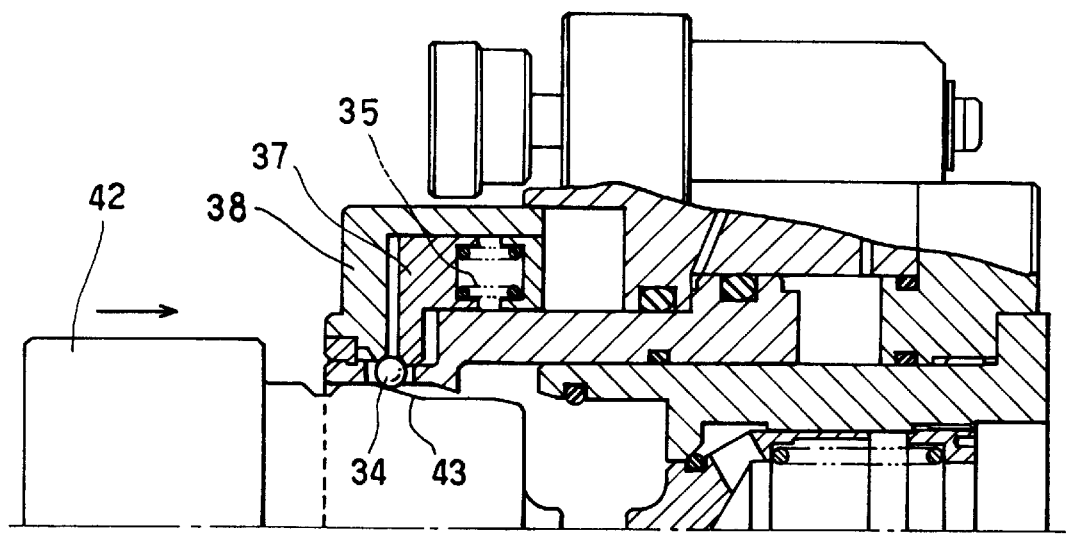
Figure 6:
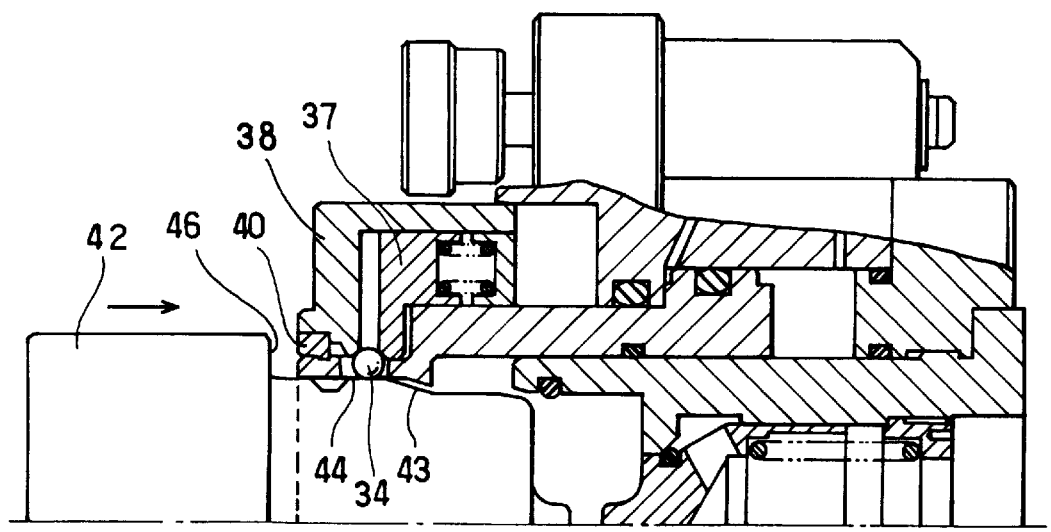
Figure 7:
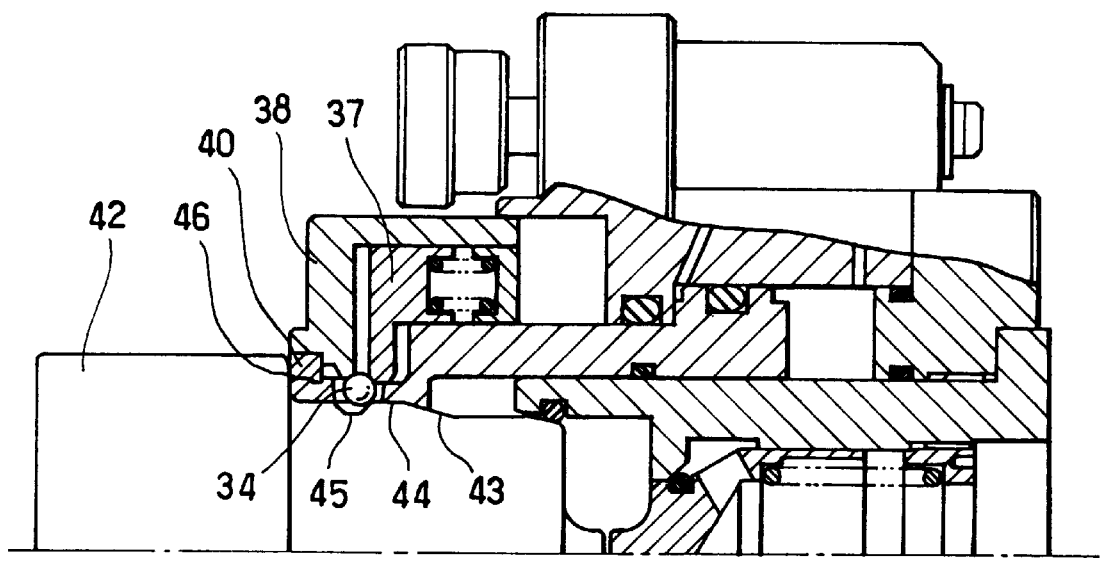
Figure 8:
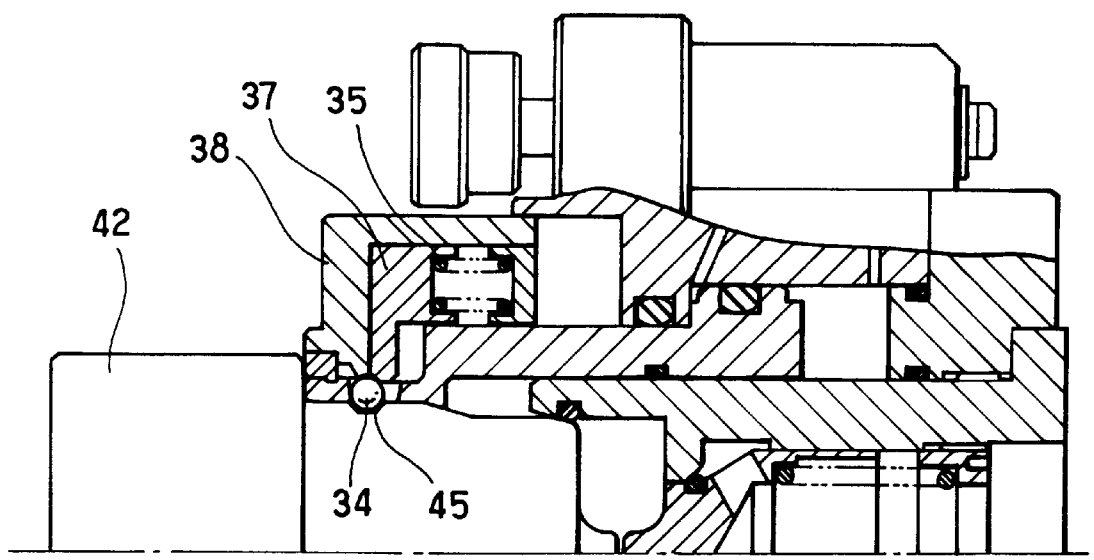
Figure 9:
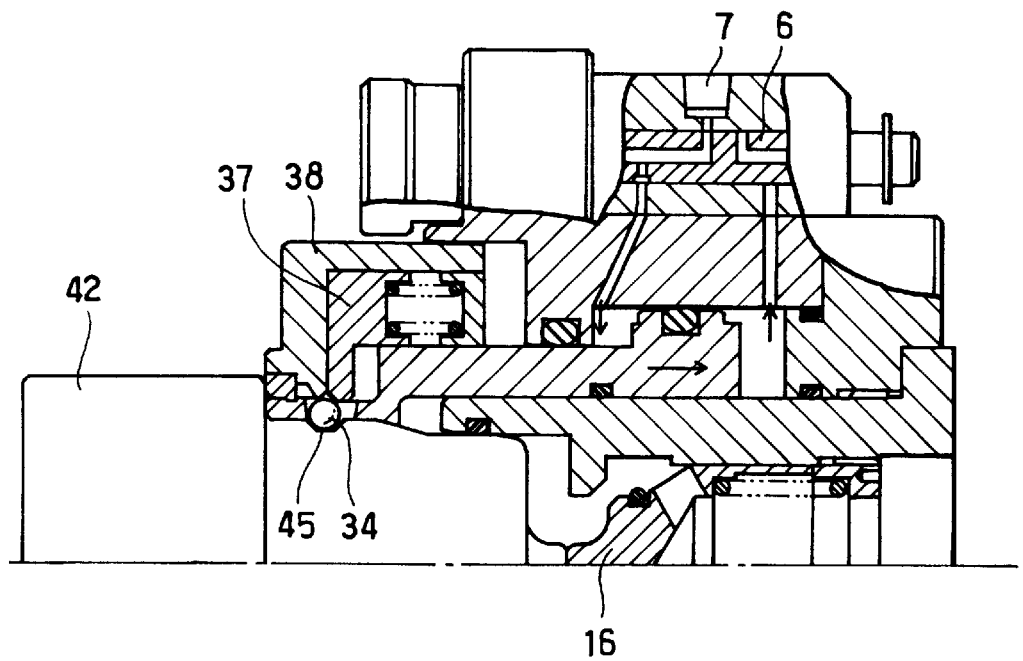

Under such circumstances, when the plug member 42 is further advanced rightward relative to the slider 25, as shown in FIG. 5, an outer tapered surface 43 of the plug member 42 urges the balls 34 radially outwardly, so that the balls 34 urge the inner collar 37 axially rearwardly against the resilient forces exerted by the springs 35. When the plug member 42 is further advanced rightward to move the inner collar 37 to its innermost position, the balls 34 are then urged by the inner collar 37 to move from the outer tapered surface 43 of the plug member 42 to an outer cylindrical surface 44 of the plug member 42, as shown in FIG. 6. After that, as shown in FIG. 7, when the plug member 10 42 is still further advanced rightward relative to the slider 25, the balls 34 reach the annular concave portion 45 of the outer peripheral surface of the plug member 42 and then fall into the annular concave portion 45. Consequently, a shoulder portion 46 of the plug member 42 butts at the stopper 40, as shown in FIG. 7. At this time, the inner collar 37 returns to its initial position under the influence of the resilient forces exerted by the springs 35, and butts against the inner surface of the sleeve member 38, as shown in FIG. 8. The above operation can be manually conducted, since no extraordinary effort is required of the user.

Under such circumstances, when the shaft 6 is slidably moved rightward so that the knob 11 butts at flange portion 2 of the housing 1, in contrast to the above, air supply port 7 is communicated with the side of the air passage 9 while the air discharge port 8 is communicated with the side of the air passage 10. Under such circumstances, when a pressurized air is supplied from the air supply port 7, the pressurized air thus supplied passes through both the air passage 9 and the communication passage 31 to enter a space between: the piston 28 of the slider 25; and, an axial inner wall of the small-diameter portion 2a of the flange portion 2 in the housing 1. This pressurized air acts on the slider 25 to move it rearward, i.e., rightward as viewed in FIG. 9.

Such rearward movement of the slider 25 is transmitted to the sleeve member 38 through the stopper 40 and also to the plug member 42 through the balls 34. As a result, the slider 25, sleeve member 38, inner collar 37, springs 35, spring supports 36 and the plug member 42 move rightward as a whole, as is clear from FIG. 9.

When the plug member 42 moves rightward as described above, the valve 16 is pushed also rightward against the resilient force of the spring 19 to separate from its valve seat 20, which permits the liquid supplied from the side of the plug member 42 to enter the interior of the socket member 15 through the fluid communication passages 22 of the valve 16. Incidentally, although not shown in the drawings, the plug member 42 is provided with the same valve unit in construction as that of FIG. 1, which is constructed of the valve 16, valve seat 20, O-ring 21, spring 19 and the stopper 18. Consequently, the valve unit of the plug member 42 is also opened at the same time when the valve unit of the socket member 15 is opened.

Figure 10:
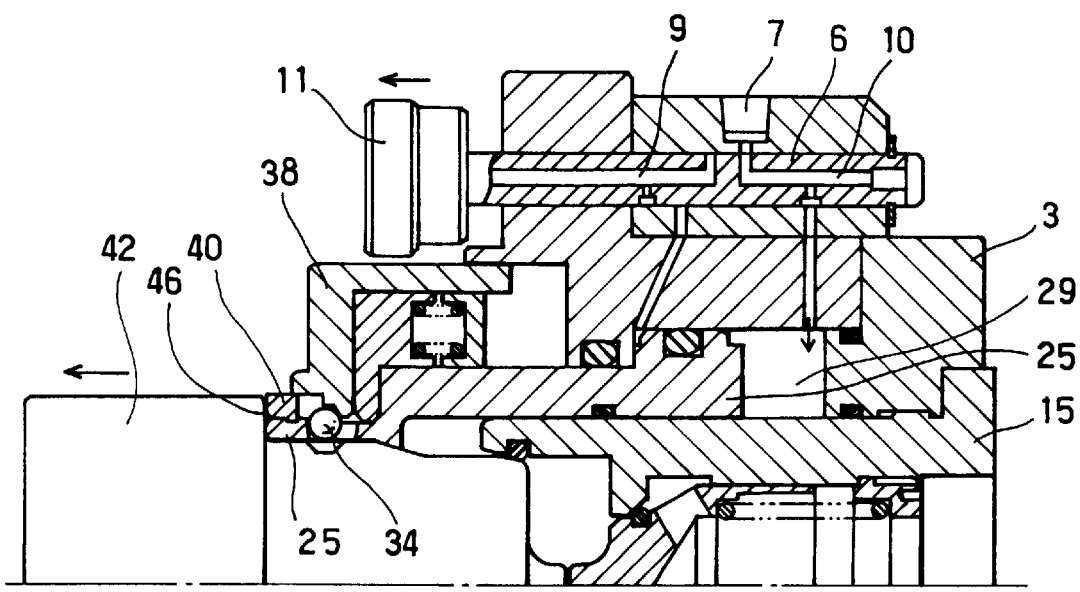
FIG. 10 is a longitudinal sectional view of the coupling assembly of the present invention, illustrating its disconnecting operation.

In disconnecting the plug member 42 from the socket member 15 after completion of liquid transfer operation, the knob 11 is pulled to slidably move the shaft 6 leftward as shown in FIG. 10, so that the relationship in communication between the air passages 9, 10 and the fluid communication passages 7, 8 having been described in the above are reversed, which permits the pressurized air to be supplied to the clearance between the slider 25 and the annular base member 3, so that the slider 25 is pushed leftward, as shown in FIG. 10. As a result, the shoulder portion 46 of the plug member 42 is urged by the forward end portion of the stopper 40 fixed to the forward end portion of the slider 25, so that the plug member 42 is disconnected from the socket member 15.

The liquid dropped and stored inside the socket member 15 during the transfer operation of the liquid described above is discharged through the drain joint 41, as required.

As described above, in the present invention, it is possible to start the coupling operation of the coupling assembly with a slight push of the plug member 42 relative to the socket member 15 and complete this coupling operation using air pressure, which makes it possible to complete the coupling operation in an easy manner. Further, according to the third aspect of the present invention, it is also possible for the coupling assembly of the present invention to completely drain off the fluid remaining in the socket member 15 after completion of the liquid transfer operation.

What is claimed is:

1. A coupling assembly for fluid transfer use, comprising:
    a housing (1)
    a socket member (15) engaged to the housing (1) having a valve which is opened when pushed,
    a cylindrical slider (25) slidably engaged between said housing (1) and said socket member (15)
    the cylindrical slider (925) having a piston (28) at a first end;
    a shaft housing (5) mounted on an outside of the housing (1) having an air supply port (7) supplying pressurized air to a front and a rear side the piston (28);
    a shaft (6) slidably engaged in the shaft housing (5) to selectively deliver the pressurized air to said front and rear side of the piston to drive the piston back and forth; and
    a plug member slidably engaged to engaging means in a second end of the cylindrical slider; wherein when said plug member is engaged in said cylindrical slider and the shaft is slid to deliver the pressurized air to the rear side of the piston the plug member engages and opens the valve in said socket to deliver fluid through the socket and the plug member.

2. The coupling assembly for fluid transfer use, as set forth in claim 1, wherein said engaging means comprises:
    a ball disposed in said cylindrical slider; and
    a concave portion formed in said plug member.

3. The coupling assembly for fluid transfer use, as set forth in claim 1, wherein:
    said socket member is provided with a drain which permits fluid remaining in said socket member to drain off.

4. The coupling assembly for fluid transfer use, as set forth in claim 2, wherein:
    said socket member is provided with a drain which permits fluid remaining in said socket member to drain off.

* * * * *